United States Patent [19]

Nicklas et al.

[11] Patent Number: 4,978,059
[45] Date of Patent: Dec. 18, 1990

[54] MODULAR PRESSURE BALANCED VALVE ASSEMBLY

[75] Inventors: James R. Nicklas, Noblesville, Ind.; Eric V. Pullen, deceased, late of Ormond Beach, Fla, legal representative; Antoinette D. Pullen, Ormond Beach, Fla.

[73] Assignee: Masco Corporation, Taylor, Mich.

[21] Appl. No.: 440,956

[22] Filed: Nov. 22, 1989

Related U.S. Application Data

[60] Division of Ser. No. 247,781, Sep. 20, 1988, Pat. No. 4,905,732, which is a continuation of Ser. No. 763,445, Aug. 7, 1985, Pat. No. 4,915,295.

[51] Int. Cl.⁵ ............................................. G05D 23/13
[52] U.S. Cl. .............................. 236/12.17; 137/625.44
[58] Field of Search ................... 137/625.4, 625.44; 236/12.16, 12.17, 12.21

[56] References Cited

U.S. PATENT DOCUMENTS

| | | | |
|---|---|---|---|
| 1,617,518 | 2/1927 | Hansen | 137/625.44 |
| 2,708,551 | 5/1955 | Record | 236/12.17 |
| 3,067,943 | 12/1962 | Renne | 137/625.44 X |
| 3,613,732 | 10/1971 | Willson et al. | 137/625.44 |

Primary Examiner—William E. Tapolcal
Attorney, Agent, or Firm—Dykema Gossett

[57] ABSTRACT

A mixing valve includes the volume control valve, a pressure proportioning valve, and a thermostatic valve assembly within a single modular housing. The housing is rotatably mounted in a valve body. The housing houses the proportioning valve and the thermostatic control valve. Rotation of the housing controls the total volumetric flow from the supply inlets of the valve plate at the end of the housing. The thermostatic control valve includes a pivotable lever which has a spring seated at one side and a thermally responsive wax element at the other side with the fulcrum of the lever between the spring and wax element. Control handles are mounted at the end of the valve to independently control the volume and the temperature. An annular discharge chamber surrounds the housing section which houses the proportioning valve. The discharge chamber is in fluid communication to an outlet which is located at the same end of the valve body as the hot and cold water inlet supply lines.

11 Claims, 4 Drawing Sheets

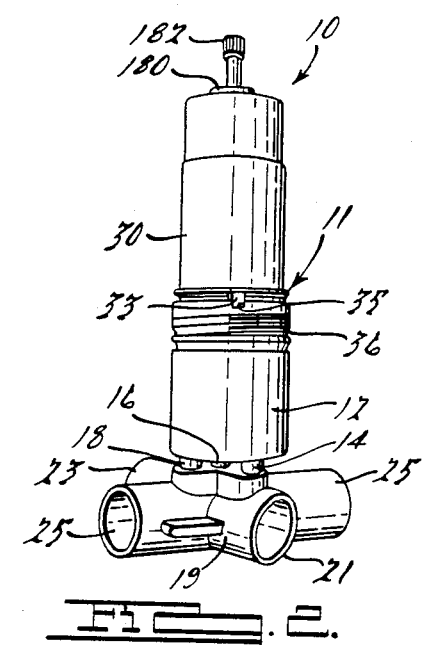
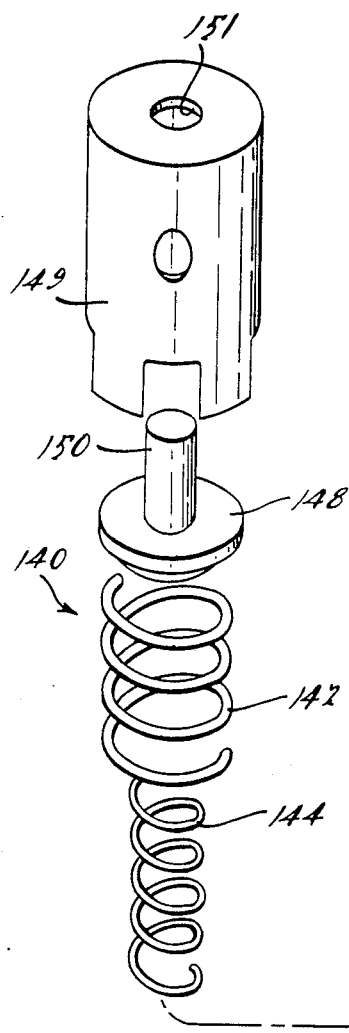
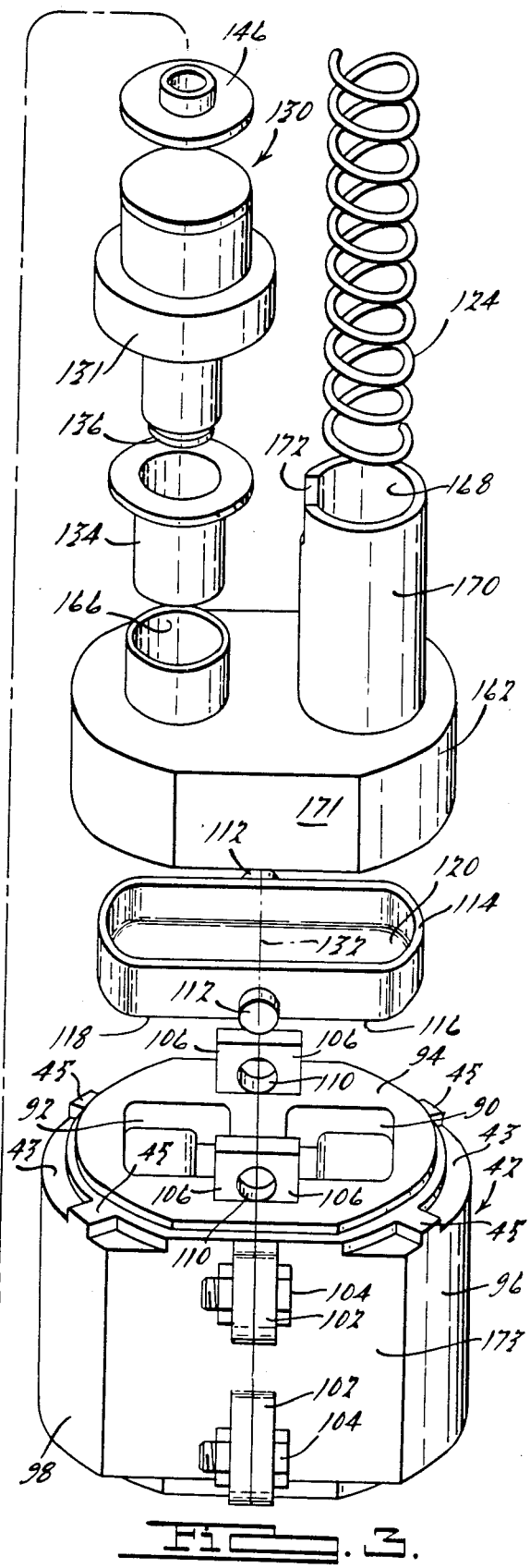
FIG. 2.
FIG. 3.

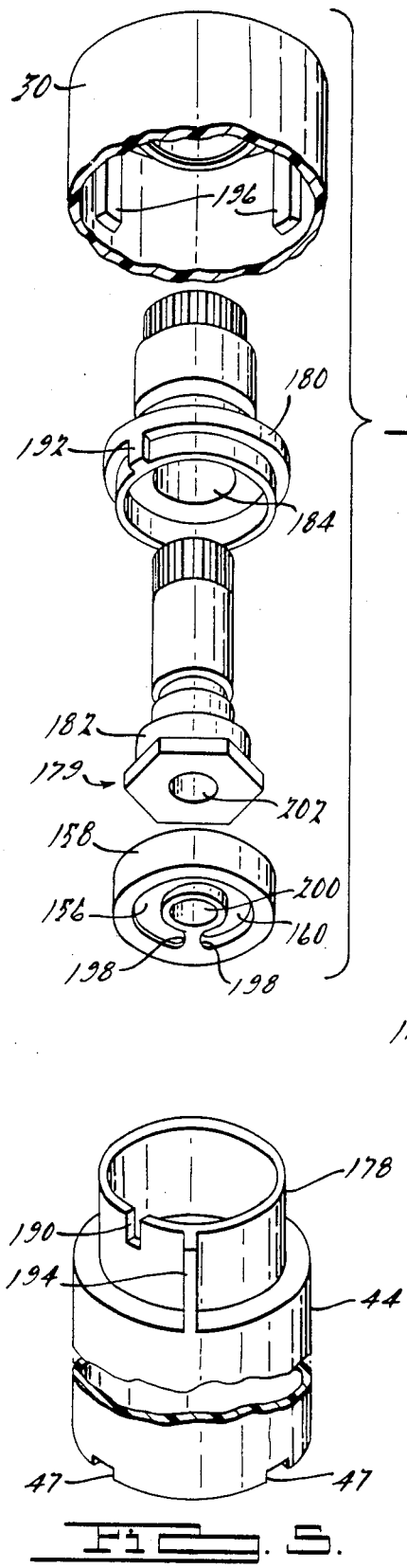
FIG. 4.
FIG. 5.
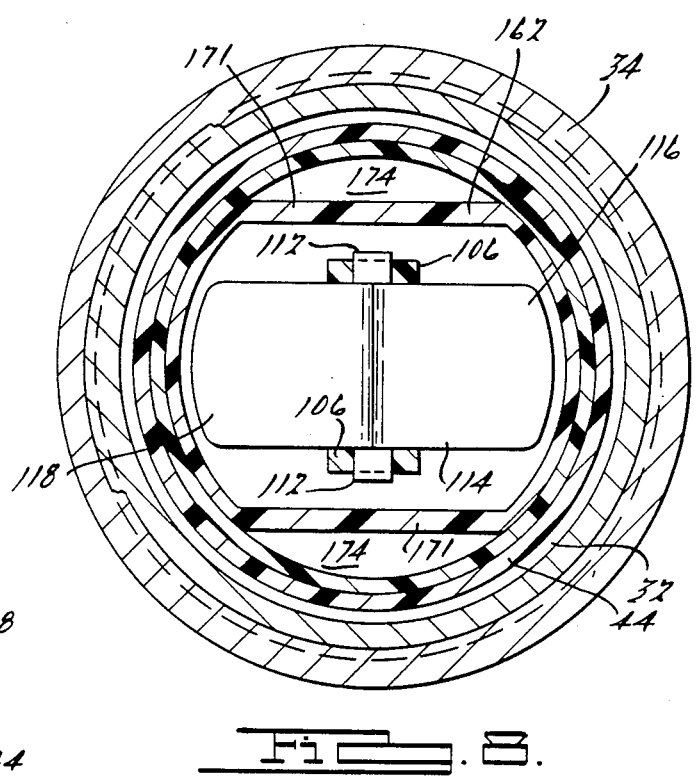
FIG. 8.

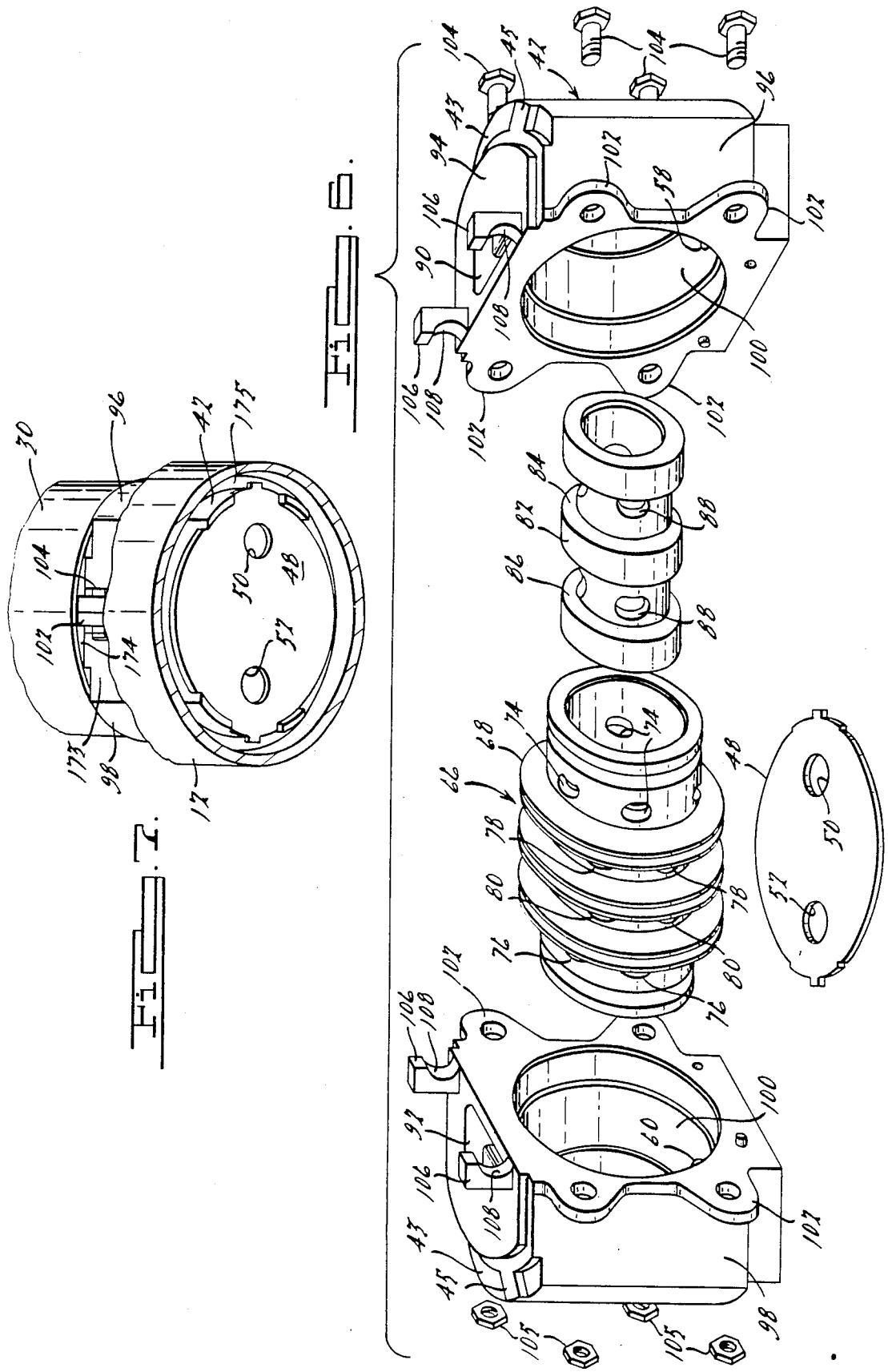

MODULAR PRESSURE BALANCED VALVE ASSEMBLY

This is a divisional of co-pending application Ser. No. 247,781 filed on Sept. 20, 1988, now U.S. Pat. No. 4,905,732, which is a continuation of application Ser. No. 763,445 filed Aug. 7, 1985, now U.S. Pat. No. 4,915,295.

BACKGROUND OF THE INVENTION

Technical Field

The present invention relates to thermostatically controlled faucets, and more particularly to thermostatically controlled faucets with pressure balance and volume control features incorporated therein.

DISCLOSURE INFORMATION

Single handle faucets have become commonplace in today's plumbing market. However, many compromises have been essential to keep the cost of faucets reasonable. Often, faucets come without pressure balance valves. The lack of a pressure balance valve results in rapid change of water temperature if either the hot water supply or the cold water supply pressure drops. The pressure drop can occur if another faucet, a dishwasher, or washing machine is turned on, or a toilet is flushed. When either the cold or hot water supply pressure changes, extreme discomfort can result if a person is taking a shower.

Furthermore, many valves have been designed without a thermostatic control. Thermostatic control is needed to eliminate constant readjustment of the valve when the temperature of the hot water supply is constantly declining or otherwise fluctuating. For example, if water pressure is constant on both the hot and cold sides but the hot water tank is running out of hot water and the hot water supply is cooling down, one must constantly adjust the valve more toward the hot to maintain the initially desired temperature.

Mixing valves have been constructed with thermostatic and pressure balance controls. Many of these mixing valves do not have any volume controls housed within the assembly and require separate volume controls either upstream or downstream from the mixing valve. Previous thermostatic mixing valves that have pressure balance and volume controls have been awkward and complicated.

What is needed is an easily assembled valve assembly which controls the total volumetric output, pressure balances the hot and cold water supply, and has a thermostatic control built therein which reduces the temperature fluctuation despite the gradual fluctuations of temperature in the hot and cold water supply lines.

SUMMARY OF THE INVENTION

In accordance with one aspect of the invention, a mixing valve for fluids includes a housing having a cavity that defines a mixing chamber. The mixing chamber has an outlet and first and second inlets. The first inlet is usually for hot water and the second inlet is usually for cold water. A lever is mounted within the cavity having a first section forming a valve for the first inlet and a second section forming a valve for the second inlet. The lever is pivotally mounted about a fulcrum within said cavity. A thermally responsive element is mounted within the mixing chamber and operably connected to the lever. The thermally responsive element is responsive to temperature within the mixing chamber to pivot the lever to different positions. The different positions vary the proportion of flow from the first and second inlets into the mixing chamber to reduce the fluctuation from a preselected temperature within the mixing chamber.

Preferably, an adjustment mechanism is connected to the thermally responsive element such that the responsive element pivots the lever to vary the flow through the first and second inlets to the mixing chamber in accordance with an adjustable preselected temperature. In one embodiment, the adjustment mechanism includes a rotatable cam that seats an end of the thermally responsive element. The opposite end of the thermally responsive element abuts the lever. Movement of the cam moves the element toward or away from the inlet and thus pivots the lever such that its first section opens or closes the first inlet and the second section closes or opens the second inlet, respectively.

In one embodiment, the fulcrum is axially positioned between the first and second inlets. The thermally responsive element and a spring are mounted on opposite sides of the fulcrum. The spring is positioned above the second inlet and biases the lever to close the second inlet. The thermally responsive element is positioned over the first inlet.

A baffle is mounted within the mixing chamber for directing fluid flow entering into the mixing chamber from the first and second inlets in a direction away from the thermally responsive element. The baffle includes a cover section for enclosing the lever and partitioning the mixing chamber into two sections; one containing the lever and another containing the thermally responsive element. The baffle preferably includes an aperture for slidably receiving a base of the thermally responsive element. The base seats against the lever.

The baffle also has a port that receives the spring that seats against the lever. The port receives substantially all fluid flow therethrough. Preferably, the spring is a coil spring passing through the port with coils of the spring acting as a mixer of the fluid from the first and second inlets. The port preferably has a tubular extension extending along a substantial length of the mixing chamber with a plurality of coils of the coil spring being positioned within the tubular extension. The tubular extension also has a slot facing the thermally responsive element for directing the mixed fluid flow exiting from the extension to the thermally responsive element.

Another aspect of the invention relates to a thermostatic mixing valve having a volume valve section mounted therewith that controls the total volumetric flow from first and second supply ports to the first and second inlets leading to the mixing chamber. The volume valve section has a volume control valve manually operable to slide against the first and second supply ports between an open position which aligns the first and second supply ports with the first and second inlets of the housing and a closed position which misaligns the first and second supply ports from the respective inlets leading to the mixing chamber. A proportioning valve preferably is interposed between the volume control valve and a thermostatic control valve mounted within the mixing chamber. The proportioning valve is responsive to the pressure to control the relative rates of flow through the first and second inlets.

Preferably the volume valve section is rigidly secured with the housing that defines the mixing chamber. The housing and volume valve section are rotatably slidable against the first and second supply ports by operation of a handle rigidly secured to the housing. The proportioning valve and the thermostatic control valve are mounted within the housing and rotate therewith.

In accordance with another aspect of the invention, the mixing chamber has an outlet that is in fluid communication with an annular discharge chamber that surrounds the valve section that mounts the volume valve and preferably houses the proportioning valve.

In this fashion, a simple and economical valve is constructed that can control the total volumetric flow independent of the temperature of the water through the mixing valve. Secondly, the valve has a proportioning balance mechanism which prevents undue fluctuations of temperature of the water due to pressure drops in either the cold or hot water supply lines. Thirdly, the valve has a thermostatic control mechanism which controls the flow of fluid to the mixing chamber from the first and second inlets based upon the temperature of the mixed fluid within the mixing chamber.

Furthermore, a baffle provides for adequate mixing of the fluids from the first and second inlets before the fluid comes into contact with the thermal responsive element within the mixing chamber. This baffle reduces the unnecessary fluctuations that can occur if the fluid is inadequately mixed before it abuts against the thermally responsive element.

In addition, the volume control valve is situated upstream from the proportioning valve such that when the volume control valve shuts off the water, the proportioning valve becomes inactive. This prevents the proportioning valve from unnecessarily shuttling back and forth in response to the pressures in the hot and cold water supplies when the volume control valve is off and it is unnecessary for the proportioning valve to function.

All the assemblies are mounted within a single modular housing assembly that can be easily attached to two supply lines and an outlet line. Complete control of the outlet water is thereby achieved by a single valve assembly that is economical and durable. The volume control valve is the shear type which does not use compression washers or plungers which allows for ease of maintenance and easy replacement of necessary seals.

BRIEF DESCRIPTION OF THE DRAWINGS

Reference now will be made to the accompanying drawings in which:

FIG. 2 is a perspective view of the valve assembly shown in FIG. 1 with the operable handles and connecting escutcheon plate removed;

FIG. 3 is an exploded top perspective view of the valve assembly mixing chamber parts;

FIG. 4 is an exploded bottom perspective view of the adjustment control parts;

FIG. 5 is a fragmented top perspective view of the valve housing top section;

FIG. 6 is an exploded view of the housing lower section mounting the proportioning valve and volume valve;

FIG. 7 is a lower perspective and partially broken view of the volume valve, lower body, and the housing showing the passage from the mixing chamber to the annular discharge chamber in the lower body; and FIG. 8 is a cross-sectional view taken along the lines 8—8 in FIG. 1.

DETAILED DESCRIPTION OF THE PREFERRED EMBODIMENT

Figure 1:
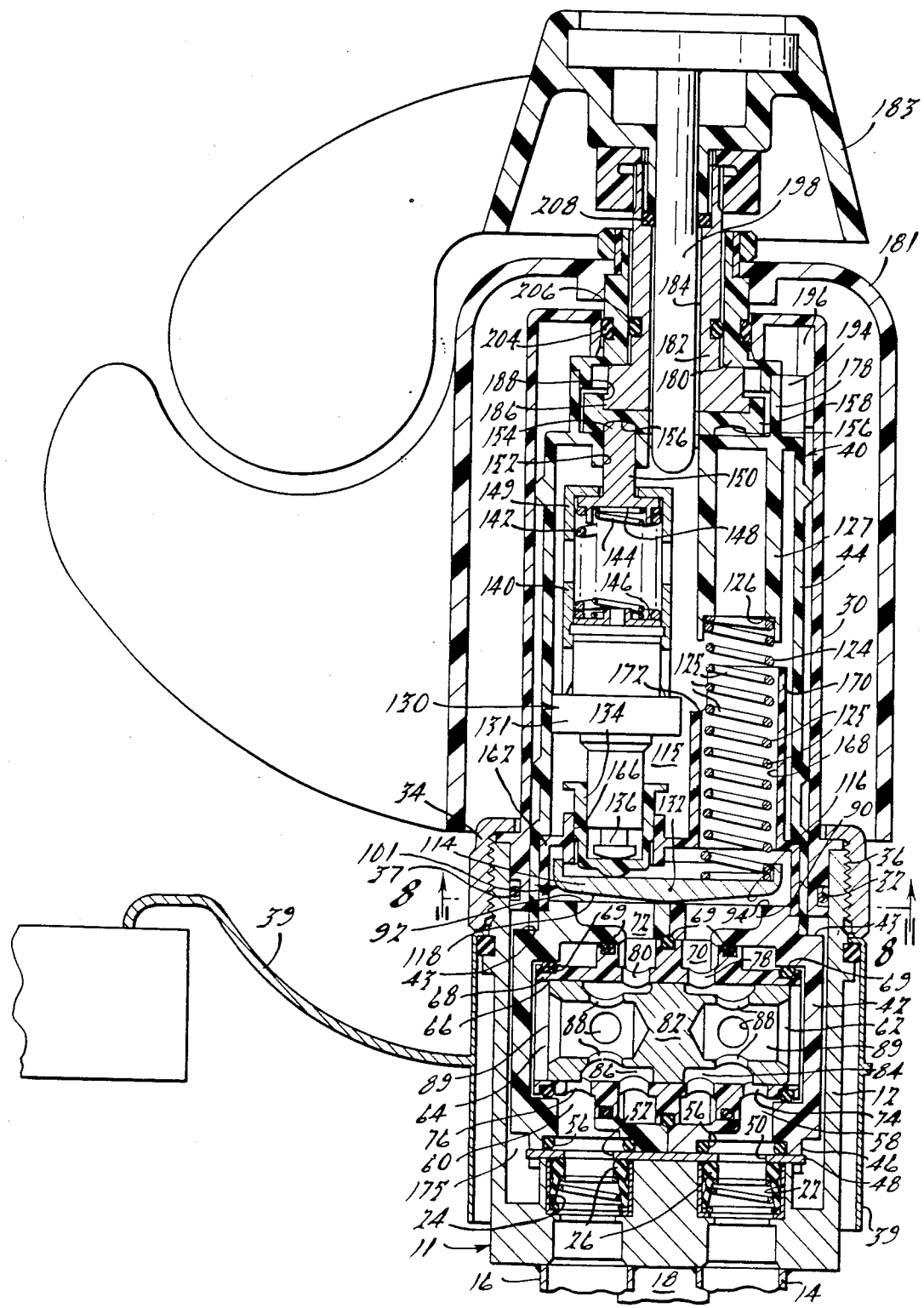
FIG. 1 is a segmented view of a valve assembly according to the invention.

Referring to FIGS. 1 and 2, a thermally responsive mixing valve 10 has a valve body 11 with an external lower valve body section 12 and upper body section 30. The lower body section 12 has two supply lines 14 and 16 and an outlet line 18. The supply lines and outlet line can be connected to a standard adapter 19 that has a cold inlet 21, hot inlet 23 and two outlets 25. Each supply line 14 and 16 has appropriately sized bores 22 and 24 at the downstream end to receive a spring and seal assemblies 26. The lower external valve body section 12 telescopically receives an upper body section 30 that is keyed in position by slots 35 and key 33. A seal ring 32 in groove 37 prevents leakage therebetween. A locking bonnet 34 threadably engages external threads 36 on the lower section 12 to lock the upper section 30 thereto. The locking bonnet 34 also positions the escutcheon 39 about body section 12.

Referring to FIG. 1, a valve housing 40 is rotatably mounted within the valve body 11. As clearly shown in FIGS. 3 and 6, the valve housing 40 includes a lower section 42 that has peripheral shoulders 43 and keys 45 upwardly extending therefrom. The valve housing 40 also includes an upper section 44 as clearly shown in FIG. 5 that has slots 47 that are keyed to the lower keys 45. The lower portion 42 has at its lower end 46 a volume valve plate 48 rigidly connected thereto. Plate 48 has two inlets 50 and 52 which can be rotated such that both inlets 50 and 52 become misaligned, partially aligned or fully aligned with the bores 22 and 24 of the supply lines 14 and 16 respectively. The plate 48 abuts the seal assemblies 26. Appropriate seal rings 56 are interposed between each inlet 50 and 52 and the valve housing lower section 42 to prevent leaking therebetween.

As shown in FIGS. 1 and 6, the valve housing lower section 42 has passages 58 and 60 leading to a first section 62 and a second section 64 respectively of a spool type proportioning valve 66. The spool type proportioning valve 66 has an outer spool 68 with five sealing rings 69 about its outer circumference to separate inlet passage 58, the inlet passage 60, the continuation passage 70 of inlet passage 58, and the continuation passage 72 of passage 60. The outer spool 68 also has axially spaced apertures 74, 76, 78 and 80 aligned with the respective passages 58, 60, 70 and 72. A piston 82 is slidably mounted within the outer spool 68. The piston has two annular grooves 84 and 86. The grooves 84 and 86 selectively communicate the passages 58 to 70 and 60 to 72 depending on the axial position of the piston 82. The piston 82 also has apertures 88 therethrough which communicate the grooves 84 and 86 to the internal section 89 to allow fluid from each passage 58 and 60 to exert pressure against the full cross sectional area of each end of the piston 82.

As shown in FIGS. 1, 3 and 6, passages 70 and 72 have inlet ends 90 and 92 at the flat upper surface 94 of the lower housing section 42. The lower section 42, for ease in manufacturing, is made from two halves 96 and 98, each having a cavity 100 sized to receive the proportioning valve 66. Each half also has a flange 102 that receives thread fasteners 104 and nuts 105 to secure the two halves together. Each half 96 and 98 also has two upper prongs 106, each having a recess 108 such that when the halves are joined together, the recesses 108 form apertures 110 that pivotably receive fulcrum pins 112 of a valve lever 114.

The upper portion 44 of housing 40 defines a mixing chamber 115 that houses the thermostatic valve assembly 101. The valve lever 114 as shown in FIGS. 1, 3 and 8, has two lower valve surfaces 116 and 118 inclined with respect to each other such that when the lever pivots about pins 112, each valve surface 116 and 118 can close inlet ends 90 or 92, respectively. Lever 114 has its upper surface forming a seat 120. Seat 120 seats the lower end of coil spring 124 which has its upper ends seated against the seat 126 on the lower end of post 127 that is integral with upper portion 44 of valve housing 40. The spring 124 is compressed between the lever 114 and seat 126 such that it biases the lever 114 to close off inlet end 90 with valve surface 116.

The thermostatic valve assembly 101 includes a thermally responsive element 130 as shown in FIGS. 1 and 3 that is operably seated against seat 120 of lever 114 within the mixing chamber 115 on the opposite side of the pivot fulcrum 132 from the spring 124. The thermally responsive element 130 includes a wax cartridge is 131 of conventional construction. One suitable cartridge is model number 18110H by Caltherm. The wax cartridge has a protruding pin 136 that is seated in a sliding base 134. The top of the wax cartridge 131 seats against a spring overload assembly 140. The spring overload assembly 140 includes two coaxially mounted coil springs 142 and 144 interposed between seats 146 and 148 within cage 149. The coil springs 142 and 144 have a combined compression rate significantly higher than coil spring 124. The upper seat 148 has an extension post 150 extending upwardly therefrom and passing through aperture 151 in cage 149 and aperture 152 in the housing upper section 44.

Referring now to FIGS. 1, 3 and 8, a baffle member 162 is positioned in the mixing chamber 115 over the lever 114. The baffle member 162 has a first aperture 166 which slidably receives the base 134. The baffle member 162 also has a port 168 aligned above the cold water inlet end 90. The baffle 162 has a width dimensioned larger than the width of the lever to allow fluid to flow about the lever 16 from the inlet ends 90 and 92 to the port 168. A tubular extension 170 surrounds port 168 extending upwardly toward the top end of the wax cartridge 131. A plurality of the coils 125 of coil spring 124 are positioned within the tubular extension 170. The upper end of the extension has a slot 172 facing the wax cartridge 131 to allow water to flow from the slot toward the wax cartridge 131.

The upper section 44 of the housing 40 is circular at its lower end while the baffle 162 and lower portion 42 have flattened sides 171 and 173 such that outlets 174 as shown in FIGS. 7 and 8 are provided which allow fluid to flow from the mixing chamber 115 out to an annular discharge chamber 175 surrounding lower housing section 42 within the valve body 12 which then leads to the outlet line 18.

The adjustment control for the volume is illustrated in FIGS. 1, 4 and 5. The top cylindrical flange 178 of upper housing portion 44 is keyed through slot 190 to a key 192 of an annular handle stem 180 that can be splined or keyed to a handle 181. Rotation of handle 181 rotates the housing 40 which in turn rotates the valve plate 48 to control the volume of water flowing from the supply lines 14 and 16 through the valve housing and out to the output line 18. Lug 194 extending from the annular flange 178 of housing section 44 is interposed between two vertical splines 196 in the body section 30 to limit the rotation of the housing 40.

The temperature adjustment control 179 is also illustrated in FIGS. 1, 4 and 5. The outer end 154 of post 150 extends into an arcuate slot 156 in rotatable cam member 158. The slot 156 has an inclined surface 160 such that as the member 158 rotates it axially displaces the post 152 and hence the thermally responsive assembly 130 downwardly toward the inlet end 92 or allows the thermally responsive assembly 130 to axially move upward away from the inlet end 92 while coil spring 124 pivots the lever 114 to maintain abutting contact between the lever 114 and the thermally responsive member 130.

The cam member 158 is attached for operable rotation to a control stem 182. The stem 182 includes a hex landing 186 that fits in a complementing recess 188 in cam member 158. The stem 182 extends upwardly through aperture 184 in handle stem 180 and can be splined to a central control knob 183. The control knob 183 when rotated controls the position of the wax cartridge 131 which in turn controls the temperature of the fluid within the mixing chamber as described below. The two shoulders 198 at the two ends of arcuate groove 156 limit the rotation of the stem 182.

An optional thermal indicator can extend through apertures 200 and 202 in cam member 58 and stem 182 respectively. Furthermore, appropriate seals 204, 206 and 208 prevent leakage from valve housing 40.

OPERATION OF THE VALVE

The valve housing can be in an off position such that the valve plate 48 has its inlets 50 and 52 misaligned with the supply lines 14 and 16 and their accompanying bores 22 and 24 such that spring seal assemblies 26 abut against the valve plate 48. In this position, no water flows past the seal assemblies 26. The handle stem 180 can be rotated to rotate housing 40 and volume valve plate 48 to allow fluid communication between inlet 50 and the cold water supply line 14 and inlet 52 and hot water supply line 16. The inlets 50 and 52 can be either selectively partially aligned or fully aligned depending upon how much volumetric flow is desired to the outlet line 18. The inlets 50 and 52 have the same size and are positioned to provide for the same amount of partial alignment simultaneously.

Once the valve is opened, cold and hot water respectively flow through passages 58 and 60 to the appropriate apertures 74 and 78 within spool 68. The water pressure within the two supply lines act upon the piston 82 to even the flow rate of the hot and cold water passing to the continuation passages 70 and 72 if the pressure in the two supply lines 14 and 16 is uneven.

Water passing through the continuation passages 70 and 72 pass into the mixing chamber 115 around the lever 114. The fluid flow is then directed up through the port 168 into the tubular extension 170 where the hot and cold water mix together with the help of turbulence created by the presence of the coils 125. The mixed water then flows through slot 172 toward the wax element 131. The wax element 131 responds to the ambient temperature of the mixed water to properly extend the pin 136 to a corresponding position. The water in mixing chamber 115 then flows down through the outlets 174 at the lower end of the upper portion 44, through the annular discharge chamber 175, and out through the outlet line 18 to a tub spout, shower head or the like.

If the mixed water flowing into chamber 115 is hotter than the wax cartridge 131, the wax cartridge heats up and pushes pin 136 to an extended position. If, on the other hand, the mixed water flowing into chamber 115 is colder than the wax cartridge 131, the wax cartridge cools down and retracts the pin 136.

The temperature adjustment control 179 is adjusted by the turning of the control stem 182 which axially moves the thermally responsive element 130 axially up or down toward or away from the inlet end 92. For example, if hotter water is desired, the control stem 182 is rotated in a direction such that the post 150 extends into the deeper part of slot 156. The coil spring 124 biases the lever 114 and shifts the thermal responsive element upward. The valve surface 116 of lever 114 further restricts inlet end 90 and valve surface 118 moves away from inlet 92 thereby creating a restriction on the cold water side and allowing an increase in hot water to flow into the mixing chamber 115. The lever 114 pivots until any clearance between the wax cartridge 131 and the inclined surface 160 of slot 156 is taken up.

On the other hand, if colder water is desired, the control stem 182 is turned such that the cam member 158 is rotated so that the inclined surface 160 of groove 156 pushes the wax element 131 toward the inlet end 92 and pivots the lever 114 such that valve surface 118 moves toward the inlet end and restricts the flow from the inlet end 90 into the mixing chamber 115. Because the spring assembly 140 has a compression rate significantly higher than the coil spring 124, it does not compress but merely forces the coil spring 124 to compress.

The thermostatic valve assembly 101 within the mixing chamber 115 compensates for changes in temperature of the water within the hot or cold supply line. For example, if the hot water line has only lukewarm water in the beginning, and the temperature is set for a warmer setting, the combination of the shifted higher position of the wax element 131 and the semi-retracted position of pin 136 allows the coil spring 124 to expand and pivot lever 114 to shut off the cold water inlet end 90 thereby allowing only the water from the hot supply line 16 to enter the mixing chamber 115 and pass out through the outlet line 18. As the temperature in the hot water line starts to exceed the set temperature, the wax element 131 heats up and extends post 136 so that the lever 114 starts to pivot whereby the valve surface 118 starts to restrict the inlet end 92 and valve surface 116 lifts from and opens up inlet end 90 to allow cold water to enter the mixing chamber 115 to mix with the hot water.

On the other hand, if the hot water within the supply line 16 starts to cool down (for example, the water tank is running out of hot water) the wax cartridge 131 then contracts in response to the cooler mixed water and allows the coil spring 124 to expand and pivot the lever 114 to restrict or close off inlet 90 to reduce the cold water flow and opens up inlet end 92 to allow more hot water to flow into mixing chamber 115 to compensate for the lower hot water temperature.

The spring overload assembly 140 is normally in a relaxed state. If, however, hot water has been flowing through the mixing chamber 115, the wax cartridge 131 has its pin 136 extended so that the cartridge 131 is fully expanded between the incline surface 160 of the groove 156 in cam member 158 and the lever 114, and if the control stem 182 is then quickly rotated to the cold position: the assembly 140 can be compressed. The cam member 158 drives the post 150 toward the lever 114, the lever 114 pivots until the valve surface 118 completely closes off the inlet end 92. The wax cartridge 131, however, is still expanded due to its inability to instantly contract from exposure to the cold water. The overhead spring assembly 140 then compresses to compensate for the extra length of the cartridge 131. As the wax cartridge 131 contracts in response to cold water within the mixing chamber 115, the spring overload assembly 140 then expands back to its normal relaxed state.

If pressure in the cold or hot water line suddenly drops, the proportioning valve 66 immediately responds to this pressure drop to maintain the same comparative flow rates through inlet ends 90 and 92 even though the pressure within the supply lines 14 and 16 may radically change. The proportioning valve 66 prevents sudden temperature changes due to pressure changes within the hot and cold supply lines that can be caused by diversion of either some of the hot or cold water to a toilet, dishwasher, washing machine or another faucet.

The present invention provides a reliable and compact thermostatically controlled volume valve assembly with a pressure balance valve in a single assembly. The mixing valve is controlled by two coaxially mounted handles that are conveniently placed at the end of the valve assembly.

The thermostatic valve assembly is easily constructed. A pivoting lever that is controlled at each side of its fulcrum by a valve spring and a thermally responsive wax element. The pivoting lever has two valve surfaces to control the flow of hot and cold fluid. The temperature adjustment is easily operable by use of an arcuate cam that can be rotated to its desired position.

A proportioning valve is housed within the valve housing for providing pressure balance of the hot and cold water supplies. The proportioning valve is mounted within a volume valve housing that can be rotated within the valve body to control the total volumetric flow through the valve assembly. The housing is compactly structured with the mixed fluid doubling back and passing through an annular discharge chamber which surrounds the proportioning valve to an outlet at the same side of the valve body as the two water inlets.

Furthermore, the housing contains the volume valve, proportioning valve and thermostatic control valve. The modular feature of the mixing valve provides for ease in maintenance. The mixing valve can obtain new valve components by mere removal of the housing and replacement with a new housing containing new valve components.

Variations and modifications of the present invention are possible without departing from its spirit and scope as defined by the appended claims.

The embodiments of the invention in which an exclusive property or privilege is claimed are defined as follows:

1. A mixing valve characterized by:
  a body having first and second supply ports and an outlet;
  a pivotally mounted lever having valving surfaces and pivotally mounted about a fulcrum with respect to said body to restrict and adjust relative flow through said ports;
  means for controlling the pivotable position of said lever and said valving surfaces for controlling the relative flow through the first and second supply ports;

said means for controlling said pivotal position of said lever including a post operably engaging said lever at a position spaced from said fulcrum of said lever; and handle means operably connected to said post to operably move said post thereby pivoting said lever.

2. A mixing valve as defined in claim 1 further characterized by:

said handle means including a rotatable cam that axially adjusts the position of said post.

3. A mixing valve as defined in claim 1 further characterized by:

a housing incorporating said first and second inlets and pivotably mounting said lever;

said housing being rotatable in said body to slidably move said inlets over first and second supply ports in said body between an open position and closed position;

said housing having first and second passage leading to said pivotably mounted lever with said lever having one section forming a valve for a downstream end of said first and second passage.

4. A mixing valve as defined in claim 3 further characterized by:

a proportioning valve means mounted in said housing for proportioning the flow through said first and second passages in response to the pressures in the first and second supply ports, said proportioning valve means being positioned between said inlets and said downstream ends of said passages.

5. A mixing valve as defined in claim 4 further characterized by:

an annular discharge chamber in said body with said chamber surrounding said housing and being in fluid communication with said outlet in said housing and said outlet in said body.

6. A mixing valve as defined in claim 4 further characterized by:

said housing having a lower section housing said proportioning valve means, and an upper section receiving said lever and defining a mixing chamber;

said upper housing defining at least in part said outlet of said housing; and said upper section being non-rotatably connected to said lower section for rotation therewith.

7. A mixing valve as defined in claim 6 further characterized by:

an annular discharge chamber in said body with said chamber surrounding said lower section of said housing and being in fluid communication with said outlet in said housing and said outlet in said body.

8. A mixing valve as defined in claim 1, further characterized by:

said valving surfaces each being laterally spaced relative to said fulcrum on said lever, and said post also being laterally spaced with respect to said fulcrum.

9. A mixing valve as recited in claim 8, further characterized by:

a spring member operably engaging said lever at a position laterally spaced from said fulcrum on the opposite side of said lever from said means for controlling said pivotal position of said lever.

10. A mixing valve as recited in claim 1, further characterized by:

a spring member operably engaging said lever at a position spaced from said fulcrum on the opposite side of said lever from said means for controlling said pivotal position of said lever.

11. A mixing valve as defined in claim 1, further characterized by:

different temperature fluids being provided in said first and second supply ports, the pivotal position of said lever supplying predetermined quantities of fluid from said first and second supply ports to a mixing chamber, said means for controlling said pivotal position including a manually adjustable means for indicating a desired temperature, and further including means responsive to the actual temperature of the fluid in the mixing chamber to further adjust the pivotal position of said lever.

* * * * *